(12) United States Patent
Luna Nell (10) Patent No.: US 9,908,498 B2
(45) Date of Patent: Mar. 6, 2018

(54) FRONT AIRBAG

(71) Applicant: TRW AUTOMOTIVE GMBH, Alldorf (DE)

(72) Inventor: Mathias Luna Nell, Fellbach (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 15/116,273

(22) PCT Filed: Feb. 3, 2015

(86) PCT No.: PCT/EP2015/000213
§ 371 (c)(1),
(2) Date: Aug. 3, 2016

(87) PCT Pub. No.: WO2015/117752
PCT Pub. Date: Aug. 13, 2015

(65) Prior Publication Data
US 2017/0008477 A1 Jan. 12, 2017

(30) Foreign Application Priority Data
Feb. 6, 2014 (DE) .................. 10 2014 001 506

(51) Int. Cl.
*B60R 21/231* (2011.01)
*B60R 21/205* (2011.01)
(Continued)

(52) U.S. Cl.
CPC .......... *B60R 21/231* (2013.01); *B60R 21/205* (2013.01); *B60R 2021/0044* (2013.01);
(Continued)

(58) Field of Classification Search
CPC .................. B60R 21/231; B60R 2021/23533
See application file for complete search history.

(56) References Cited

U.S. PATENT DOCUMENTS 5,316,337 A 5/1994 Yamaji et al.
7,131,664 B1 * 11/2006 Pang .................. B60R 21/233
280/743.2
(Continued)

FOREIGN PATENT DOCUMENTS

JP 2013006501 A * 1/2013 ........... B06R 21/231
WO 2010057607 5/2010
(Continued)

OTHER PUBLICATIONS

Yamaji et al., Manufacturing Method for Airbag, and Airbag, JPO, JP 2013-006501 A, English Abstract.*
(Continued)

*Primary Examiner* — James A English
(74) *Attorney, Agent, or Firm* — Tarolli, Sunheim, Covell & Tummino LLP (57) ABSTRACT

A front airbag (10) comprising a cut including two substantially triangular side portions (30, 32) facing toward each other by a respective side which form at least the side walls (18, 20) and at least portions of the upper and lower walls (22, 24) as well as a central portion (44) located between the side portions (30, 32) which is adjacent to the sides of the triangular side portions (30, 32) facing each other and forms at least the front wall (16), wherein in the area of the side walls (18, 20) a respective transitional portion (34, 36) is present between a side portion (30, 32) and the central portion (44), wherein at least one connecting portion (46, 48, 50, 52) projecting from the central portion (44) or the side portions (30, 32) in an outspread state of the cut is provided for the transitional areas (34, 36) associated with the lower and/or upper wall (22, 24) and wherein the connecting portion (46, 48, 50, 52) of the finished front airbag (10) is connected both to the central portion (44) and to at least one side portion (30, 32).

21 Claims, 8 Drawing Sheets (51) Int. Cl.
*B60R 21/235* (2006.01)
*B60R 21/00* (2006.01)
(52) U.S. Cl.
CPC ............ *B60R 2021/0048* (2013.01); *B60R 2021/0055* (2013.01); *B60R 2021/23533* (2013.01)

(56) References Cited

U.S. PATENT DOCUMENTS

| | | | | |
|---|---|---|---|---|
| 2002/0043792 A1* | 4/2002 | Keshavaraj | ............ | B60R 21/231 280/743.1 |
| 2007/0108753 A1* | 5/2007 | Pang | ............ | B60R 21/231 280/743.2 |
| 2009/0115177 A1* | 5/2009 | Pausch | ............ | B60R 21/231 280/743.2 |
| 2012/0098242 A1* | 4/2012 | Aranzulla | ............ | B60R 21/231 280/743.1 |
| 2013/0056966 A1 | 3/2013 | Miyata | | |
| 2014/0339798 A1* | 11/2014 | Motomochi | ............ | B60R 21/231 280/732 |
| 2015/0042081 A1* | 2/2015 | Yamada | ............ | B60R 21/231 280/730.1 |
| 2015/0074969 A1* | 3/2015 | Jindal | ............ | B60R 21/205 29/428 |

FOREIGN PATENT DOCUMENTS

WO 2012176672 12/2012
WO 2013077230 5/2013

OTHER PUBLICATIONS

Yamaji et al., Manufacturing Method for Airbag, and Airbag, JPO, JP 2013-006501 A, Machine Translation of Description.*

* cited by examiner

FRONT AIRBAG

RELATED APPLICATIONS

This application corresponds to PCT/EP2015/000213, filed Feb. 3, 2015, which claims the benefit of German Application No. 10 2014 001 506.8, filed Feb. 6, 2014, the subject matter, of which are incorporated herein by reference in their entirety.

BACKGROUND OF THE INVENTION

The present invention relates to a front airbag, especially a passenger airbag.

With airbags, depending on the interior dimensions and the contour of the adjacent surfaces (especially of the instrument panel) airbags having different characteristics are used. In the case of very plane surfaces and simple contours the so called two-dimensional airbags are used that can be manufactured at lower cost. With these airbags it is possible to manufacture the airbag from a one-piece fabric part which then is folded and sewn up at edges adjacent by folding. However, such two-dimensional airbags are suited for rather simple contours as mentioned already. What is important with the airbag is that upon impact of the occupant it can contact an adjacent vehicle part and can rest thereon.

Moreover it is desirable that the seams are not thermally overloaded.

Hereinafter, the term "seam" preferably focusses on actually sewn-up edges, wherein this is not restrictive, however, as there are already welded or glued seams and these are likewise to be understood by "seam".

An example of a so called two-dimensional airbag is given by U.S. Pat. No. 5,316,337.

Moreover, there are also the so called three-dimensional airbags in which the airbag has an outer contour that is more complex in the inflated state and consists of plural sewn up individual parts, especially of two side walls and a strip-shaped peripheral central part which interconnects the side walls so that sort of a roller is resulting which need not take the shape of a circular cylinder but may have any shapes depending on the geometry of the side walls. Such three-dimensional airbags are more difficult to sew as the edges to be sewn up are not overlying by just folding the airbag fabric.

From WO 2010/05760 A1 furthermore a passenger airbag having a design which can be adapted to different interior contours is known.

New limits e.g. concerning the strict US-NCAP crash test for maximum loads for occupants require adaptations of the known airbags so that they may further be assessed to rank first.

SUMMARY OF THE INVENTION

It is the object of the present invention to further develop a front airbag of the type mentioned in the beginning in an advantageous manner, especially to the effect that it can be manufactured in a simple and inexpensive way.

According to the invention, this object is achieved by a front airbag having a cut which comprises two substantially triangular side portions facing toward each other by a respective side, the side portions forming at least the side walls and at least portions of the upper and lower walls, as well as a central portion located between the side portions which is adjacent to the sides of the triangular side portions facing toward each other and forms at least the front wall for impact of the occupant, wherein in the area of the side walls a respective transitional area is present between a side portion and the central portion, wherein at least one connecting portion projecting from the central portion or the side portions in an outspread state of the out is provided for the transitional areas associated with the lower and/or upper wall and wherein the connecting portion of the finished front airbag is connected both to the central portion and to at least one side portion. Especially, from this front airbag according to the invention the advantage of a simple and cost-effective manufactured is resulting. The front airbag has a comparatively simple shape and a comparatively simple cut.

The side walls as well as the upper and lower walls are so-to-speak expanded by the transitional areas and by the connecting portions in the direction of the head of the occupant and, more generally, of the upper body of the occupant so that the front wall is positioned in its upper area with its head contact portion more closely to the head than in previous airbags.

It is basically possible to design the cut of the airbag in one piece. However, it is also imaginable to manufacture the cut also of several pieces, i.e. of several portions.

Moreover, it may be provided that the at least one connecting portion is substantially quadrangular, preferably rectangular. This shaping of the connecting portion permits a simple cut. Preferably both connecting portions have a quadrangular or rectangular design.

It may especially be provided that at least one connecting portion is connected by one side to the side portion and by one side to the central portion, preferably wherein the connecting portion is a projecting extension connected to the associated side portion or to the central portion. This facilitates the cut and the sewing or joining of the airbag out of the cut.

In a further configuration of the invention a connecting portion may project from each side portion. In this way the shape of the front airbag may be better adapted individually to the conditions of the vehicle.

It is basically imaginable, however, that the connecting portions are configured to be identical or different.

The central portion may be substantially rectangular. Preferably, together with the transitional portions it forms an elongate rectangle connecting the side portions in the direction of its longer extension. This shaping advantageously allows for a simple cut of the airbag extending up to the head of the upright seated occupant.

Moreover, in a further advantageous configuration the side portions may be provided to project at the ends of their base sides from the adjacent transitional areas and the projecting corners may be provided to be out off diagonally outwardly at the transition to the adjacent transitional area. This permits, for example, a one-piece cut or a cut including few parts which can manage on comparatively little material waste.

In another possible configuration of the invention the central portion including the transitional area is composed of several cuts.

In addition, it can be provided that with an outspread cut of the airbag the central portion projects from the adjacent portions at least on one side and the at least one projecting portion forms a portion of the upper and/or the lower wall.

In a side view of the inflated airbag, the front airbag may substantially take the shape of an at least pentagonal polygon. This shaping offers the advantage that the clearance between the occupant and the instrument panel is filled at the best. Two sides form support surfaces (instrument panel and front screen), two sides form the upper and lower walls and one side forms the front wall.

Moreover, the front wall may be provided to be narrowed in the inflated state viewed in the direction of the vehicle front. By the narrowing the inflating behavior of the airbag and its dimensional stability can be improved.

Another advantageous configuration of the airbag may provide that the airbag in the inflated state includes in the front wall a bulging directed outwardly to the occupant for contacting the pelvis region of the occupant. This entails the advantage that the pelvis region can be stabilized earlier by the inflated front airbag in the case of crash. The load on the pelvis region but also on the thighs of the occupant is definitely reduced in this way. The bulging may have a substantially triangular cross-section in the side view in the inflated state of the front airbag. The bulging is located or arranged, for example, so that it may contact the pelvis region and the upper pad of the thighs of the occupant.

Furthermore, in the front wall the inflated front airbag may have an indentation extending in the direction of the rear Injection orifice which is arranged substantially horizontally and which includes an abdominal contact face for impact of the abdominal region of the occupant. The indentation may be formed by beveling of the front wall, in the front wall a horizontally extending edge may be provided and the abdominal impact surface and the upper part of the front wall may enclose an obtuse angle viewed in the side view of the inflated airbag. The abdominal impact surface may have a substantially linearly extending contour at least in the side view of the inflated airbag. The abdominal impact surface may be a plane portion In the front wall in the inflated state of the airbag and may substantially be located in the lower third of the front wall.

The airbag according to the invention exhibits e.g. a filling volume of about 80 to 150 liters, preferably a filling volume of about 90 to 130 liters. This filling volume permits a rapid inflating operation and at the same time a shape of the inflated airbag which positions the head contact portion of the front airbag substantially directly in front of the head of the occupant and minimizes the distance of the head to the head contact portion in the case of crash.

In another advantageous configuration the front airbag includes a rear injection orifice, a front wall for impact of the occupant, two opposite side walls as well as upper and lower walls, wherein the front wall, viewed in a side view, in the inflated and vehicle-mounted state includes a head contact portion that is closer to the vehicle tall than a thorax contact portion. In this way the loads on the occupant, especially the loads on his/her head and neck, can be minimized.

Due to the fact that the front airbag in the inflated and vehicle-mounted state includes a head contact; portion that is closer to the vehicle tail than a thorax contact portion, the distance of the head to the impact on the head contact portion is significantly reduced.

In particular the loads on the neck but also on the head are significantly reduced in this way. This enables the strict requirements e.g. for achieving 5 stars in the NCAP crash test especially In the US-NCAP crash test, to be met.

The head contact portion may be an upper portion of the front wall for impact of the occupant which is formed by the upper third of the front wall.

The thorax contact portion may be a central portion of the front wall for impact of the occupant which is formed by the central third of the front wall.

Furthermore, the airbag wall may be provided to extend in the area of the thorax contact portion and of the head contact portion upwardly slanting in the direction of the vehicle tall. In this way it is advantageously achieved that the head contact portion in the inflated state of the airbag is placed almost directly in front of the occupant's head.

The design and the shaping of the front airbag may be carried out by way of a 50 percent dummy.

Moreover, it may be provided that, viewed in a side view, the head contact portion is transformed into the upper wall with a curvature which is larger than the maximum curvature of the upper wall and the front wall. This results in the advantage that the bead contact portion is definitely offset from the upper wall, so-to-speak almost via kind of an edge, and is not a smooth transition into the same. An impact of the bead onto part of the upper wall thus can be advantageously avoided.

In addition, the invention may provide that a pelvis contact portion of the front way, viewed in a side view, is transformed into the lower wall with a curvature which is larger than the maximum curvature of the lower wall and the front wall, in this way the pelvis contact portion is clearly offset from the lower wall of the front airbag and advantageously appropriate support of the pelvis region is obtained by the front airbag in the case of crash. Also at the transition of the front wall to the lower wall sort of an edge is formed.

In another advantageous configuration of the invention the upper wall may extend from a back wall preferably provided tor resting on the front screen, viewed in a side view in the inflated state of the front airbag, at a maximum angle of 30° vis-à-vis the horizontal line toward the head contact portion. This offers the advantage that the force exerted upon impact on the head contact portion can be introduced approximately horizontally into the front screen so as to obtain appropriate support. Moreover the airbag is prevented from filling the interior above the impact area of the occupant's head up to the roof, wherein this part of the interior is not required for reaching the function of the front airbag.

BRIEF DESCRIPTION OF THE DRAWINGS

Further features and advantages of the invention are resulting from the following description and from the following drawing which is referred to. The drawings show in.

DESCRIPTION

Figure 1:
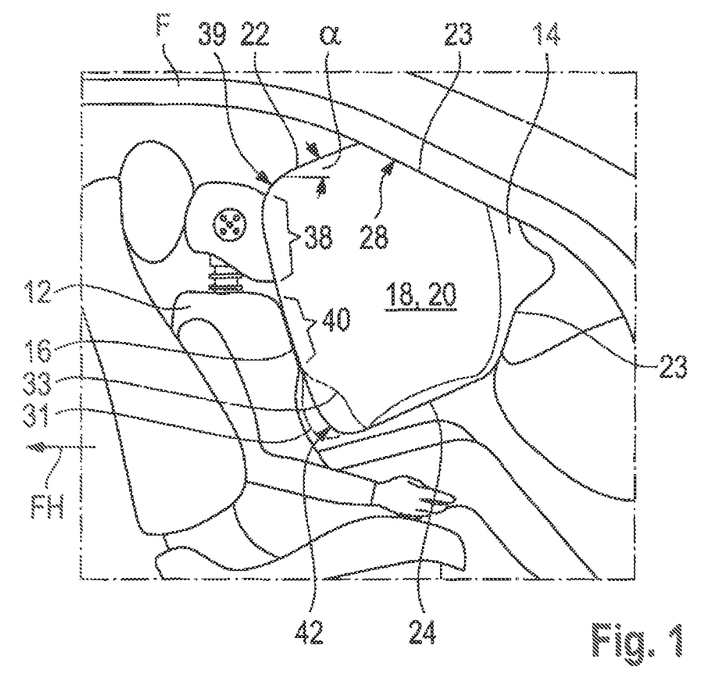
FIG. 1 a side view of the front airbag according to the invention in a first embodiment in the inflated stats with a 50 percent dummy.

FIG. 1 illustrates a side view of the front airbag 10 according to the invention in a first embodiment in the inflated state with a 50 percent dummy 12.

The front airbag 10 is a passenger airbag and includes a rear injection orifice 14 as well as an opposite front wall 18 provided for impact of the occupant. Moreover two opposite side walls 18, 20 are provided which are transformed into an upper wall 22 and a lower wall 24.

The injection orifice 14 is connected to the instrument panel 28.

As is visible from FIG. 1, the front airbag 10 in the inflated state rests on the instrument panel 28 and on the front screen 28, namely by portions of a back wall 23.

The portion of the back wall 23 adjacent to the upper wall 22 serves for resting on the front window 28, the portion of the back wall 23 adjacent to the lower wall 24 serves for resting on the instrument panel 28.

As is further evident from FIG. 1, the front wall 16, viewed in a side view, includes in the inflated state mounted in the vehicle F a head contact portion 38 which is closer to the vehicle tall FH than a thorax contact portion 40.

The head contact portion 38 in this case is an upper portion of the front wall 16 for impact of the occupant's head and is formed by the upper third of the front wall 16.

The thorax contact portion 40 is a central portion of the front wall 16 for impact of the thorax portion of the occupant and is formed by the central third of the front wall 16.

The airbag wall extends in the area of the thorax contact portion 40 and of the head contact portion 38 slanting upwards in the direction of the vehicle tall FH.

The upper wall 22 extends from the back wall portion 23, viewed in a side view, at a maximum angle a of 30° vis-à-vis the horizontal line to the head contact portion 38.

In the side view of the front airbag 10 illustrated in FIG. 1 it is evident that the head contact portion 38 is transformed into the upper wall 22 with a curvature 39 that is larger than the maximum curvature of the upper wall 22 and the front wall 16.

The curvature 39 thus forms a comparatively definite edge so that the head contact portion 38 is clearly offset from the upper wall 22.

The front airbag 10 further includes a pelvis contact portion 42 at its front wall 16.

The pelvis contact portion 42 is transformed into the lower wall 24 with a curvature which is larger than the maximum curvature of the lower wall 24 and the front wall 16.

The upper and lower walls 22, 24 extend almost linearly in a side view.

FIG. 2 once again illustrates the embodiment of the front airbag 10 according to the invention as shown in FIG. 1, however with an inserted imaginary outer contour A. As is evident from FIG. 2, the outer contour A of the front airbag 10 according to the invention takes the shape of a pentagonal polygon. In this way the front airbag 10 in the inflated state may optimally rest on the instrument panel 26 and on the front screen 28.

Figure 2:
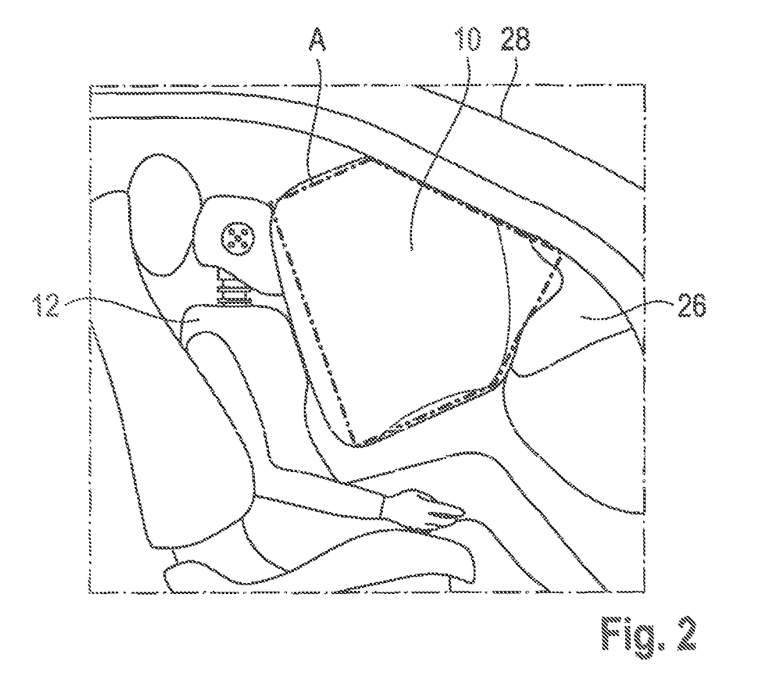
FIG. 2 another side view of the front airbag according to the invention in accordance with the embodiment of FIG. 1 in the inflated state with a 50 percent dummy and with imaginary lines for illustrating the design of the front airbag.

Basically, the polygonal shape may also have more than five corners.

Furthermore, the clearance between the 50 percent dummy 12, the instrument panel 26 and the front screen 28 is completely filled up to the height of the head of the 50 percent dummy 12, which results in excellent restraint values in particular for the occupant's head.

The airbag 10 has a filling volume of 80 to 150 liters, especially of 90 to 130 liters.

In addition, the front wall 16 may be provided to be narrowed in the inflated state viewed in the direction of the vehicle front.

In the inflated state, the front airbag 10 may have a bulging 31 directed outwardly toward the occupant for contacting the pelvis region of the occupant in the front wall 16 (cf. broken lines in FIG. 1).

The inflated front airbag 10 may include an indentation 33 extending in the direction of the rear injection orifice in the front wall, the indentation being arranged substantially horizontally and forming an abdominal contact face for impact of the abdominal region of the occupant.

Figure 3:
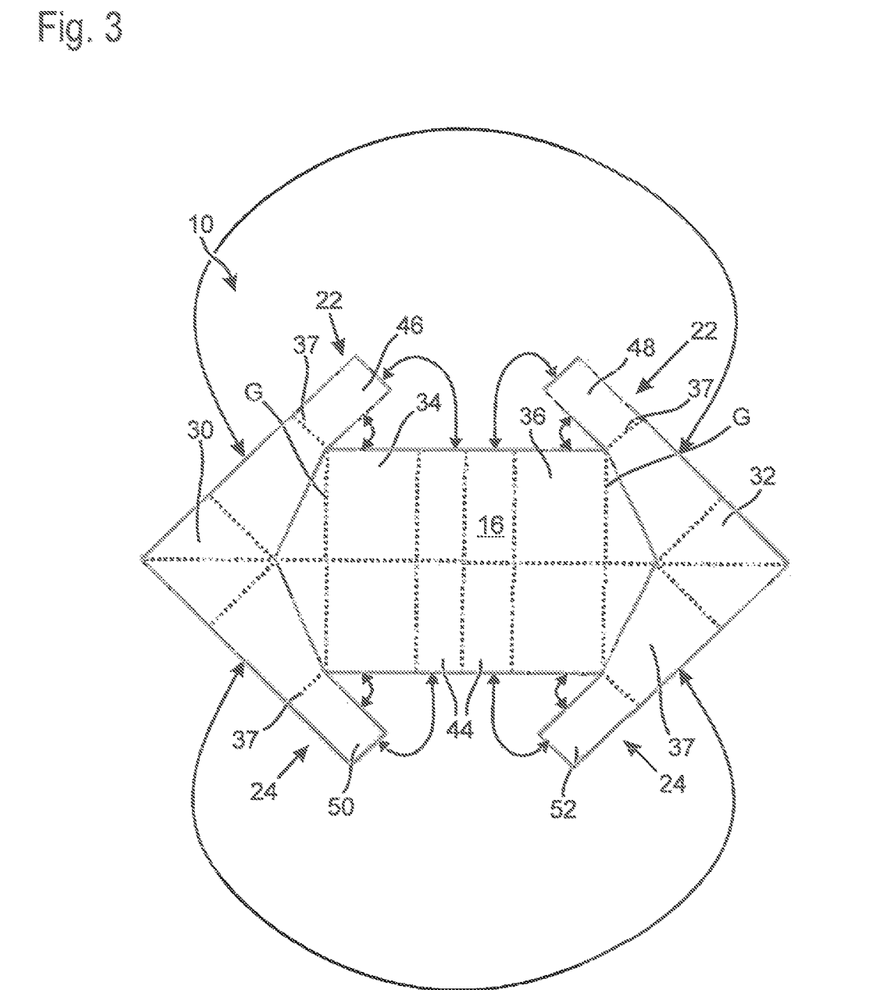
FIG. 3 a top view onto a first embodiment of a out of a front airbag according to the invention, in this case an airbag having one single fabric part.

FIG. 3 shows a top view onto a first embodiment of an outspread cut of a front airbag 10 according to the invention as it is also shown in FIG. 1, in this case an airbag comprising one single one-piece fabric part.

The cut includes two substantially triangular side portions 30, 32 facing toward each other with a respective side.

Said side portions 30, 32 partly constitute the side walls 18, 20 of the front airbag (cf. FIG. 1) but also partly or completely constitute the back wall 23.

The side walls 18, 20 are further formed by transitional areas 34, 36 present between the side portion 30, 32 and a central portion 44. The central portion 44 constitutes the entire front wall but may also form portions of the upper and/or lower walls 22, 24. The central portion 44 connects the two transitional areas 34, 36 to the respective adjacent side portions 30, 32.

At the ends of their base sides G the side portions 30 project from the central portion 44 and from the two transitional portions 34, 38. The projecting corners 37 are cut to be outwardly slanting at the transition to the two transitional areas 34, 36.

The central portion 44 is substantially rectangular. It forms an elongate rectangle extending in the direction of its longer extension in parallel to the base sides G. The transitional areas 34, 36, too, are rectangular and, jointly with the central portion 44, they form a large rectangle connecting the side portions 30, 32 in the direction of its longer extension.

Furthermore, in this embodiment of the cut four rectangular connecting portions 48, 48, 50, 52 are provided.

Said connecting portions 48, 48, 50, 52 in this case are facing the transitional areas 34, 36 and project from the two side portions 30, 32 in the form of extensions. Each of the two side portions 30, 32 therefore includes two connecting portions 46, 48, 50, 52 projecting from the same in the form of extensions.

The connecting portions 48, 48 form parts of the upper wall 22 and the connecting portions 50, 52 form parts of the lower wall 24.

After completion of the front airbag 10 the connecting portions 46, 48 and 50, 52, respectively, are connected to the side portions 30 and 32, resp., to the transitional portions 34 and 36, resp., as well as to the central portion 44 (cf. double arrows in FIG. 3 showing sewn up edges).

It is also basically imaginable that the central portion 44 and the transitional portions 34, 36 are composed of several cuts, each constituting e.g. an outer portion connected to an associated side portion 30, 32 as well as a central portion connecting the outer portions so that e.g. three parts are sewn up.

Figure 4:
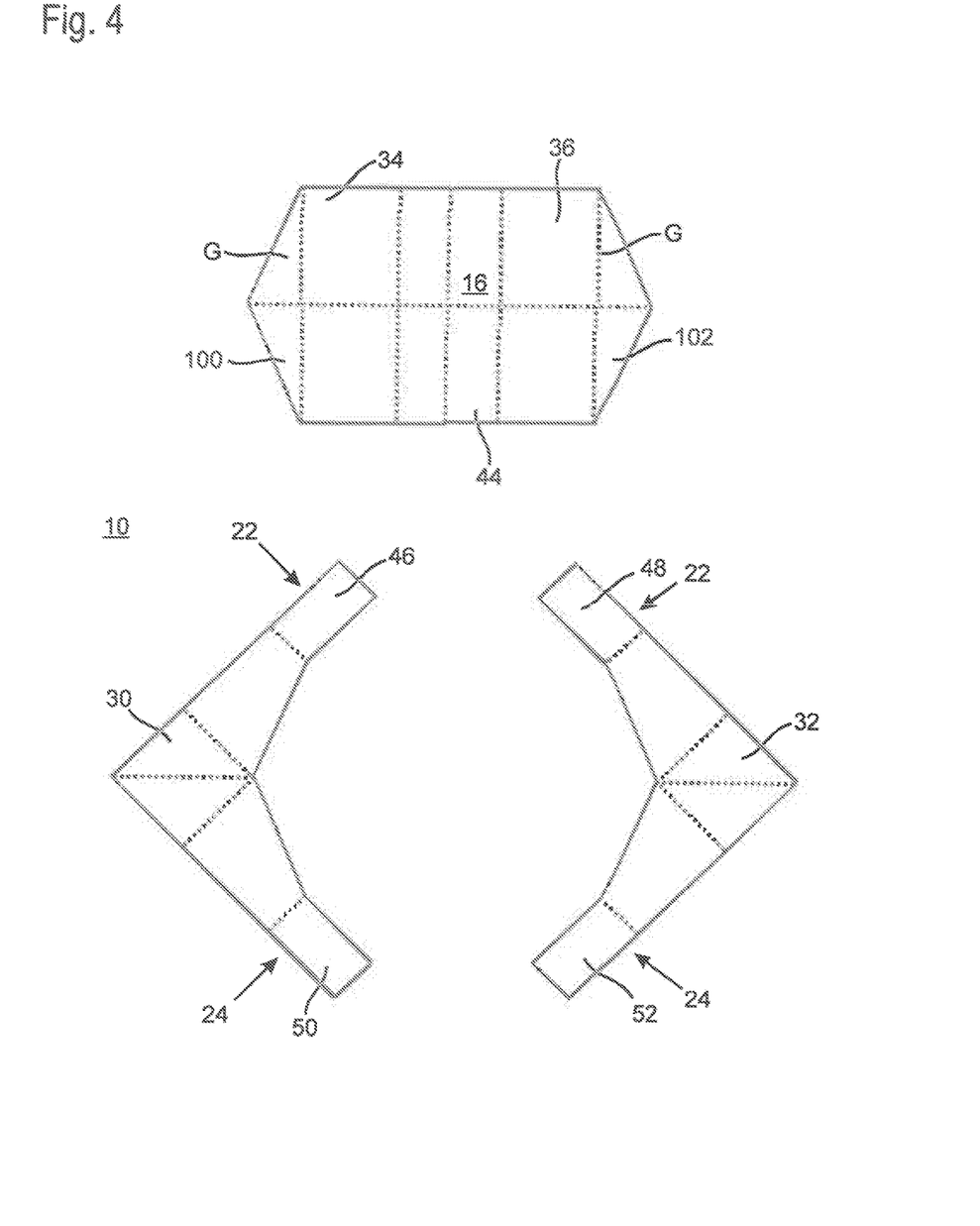
FIG. 4 a top view onto another cutting option based on the embodiment according to FIG. 3.

FIG. 4 illustrates a top view onto a further cut based on the embodiment according to FIG. 3. This cut is substantially identical to the example of FIG. 3, the difference being the cut in this case consisting of three parts.

The three parts are formed by a major part of the two side portions 30, 32 including the connecting portions 48, 48 and 50, 52, resp., provided thereon as extensions, on the one hand, and by the central portion 44 with the two transitional areas 34, 36, on the other hand. A triangle 100, 102 being adjacent to the base side G is cut out of each of the two side portions 30, 32. The two triangles 100, 102 are provided on the middle part, cf. FIG. 4.

Figure 5:
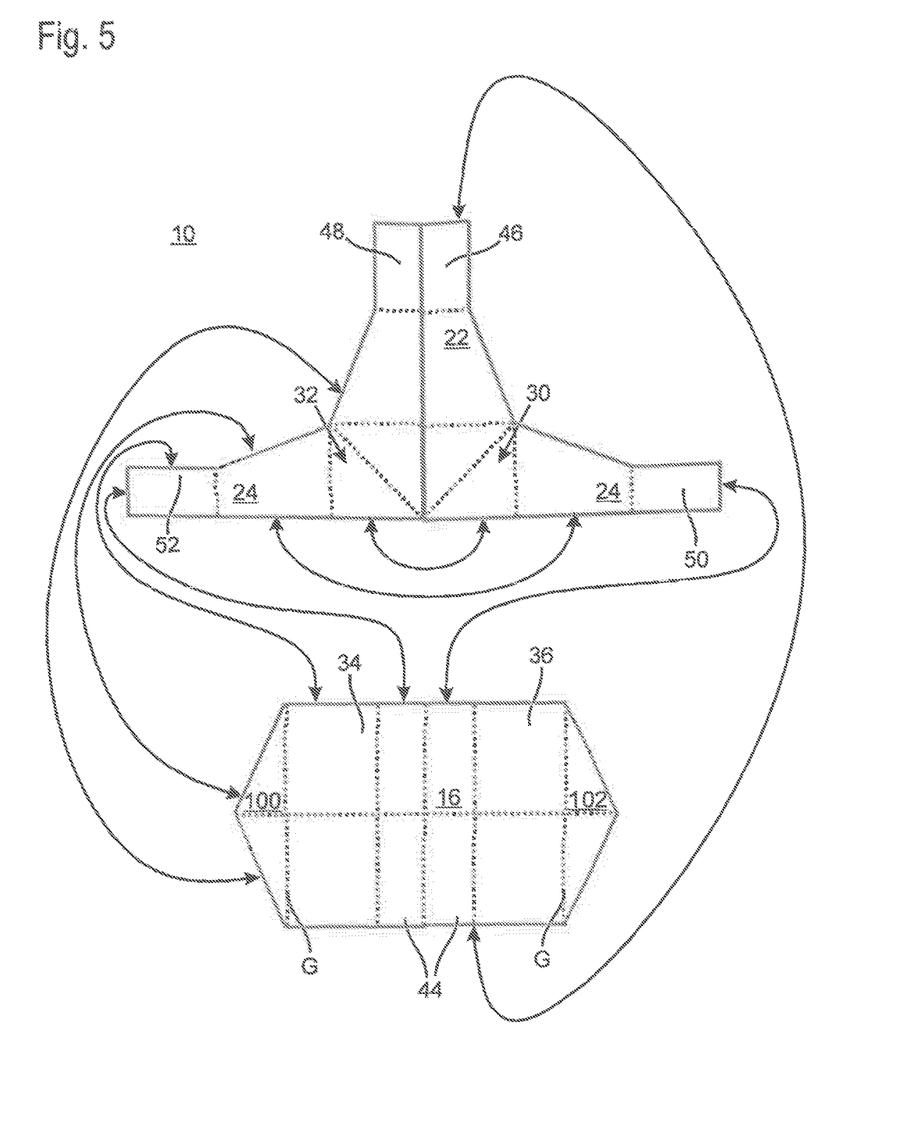
FIG. 5 a top view onto another cutting option based on the embodiment according to FIG. 3.

FIG. 5 is a top view onto a further cut based on the embodiment according to FIG. 3 and constitutes a modification of the embodiment according to FIG. 4. This cut is substantially identical to the example according to FIG. 3, the difference being the cut in this case consisting of two parts. Several of the sewn up edges are associated with double arrows again.

The two side portions 30, 32 are transformed into each other in one piece at a respective leg. The cut for the central portion 44 and the two transitional areas 34, 36 as well as the triangles 100,102 are identical to FIG. 4.

Figure 6:
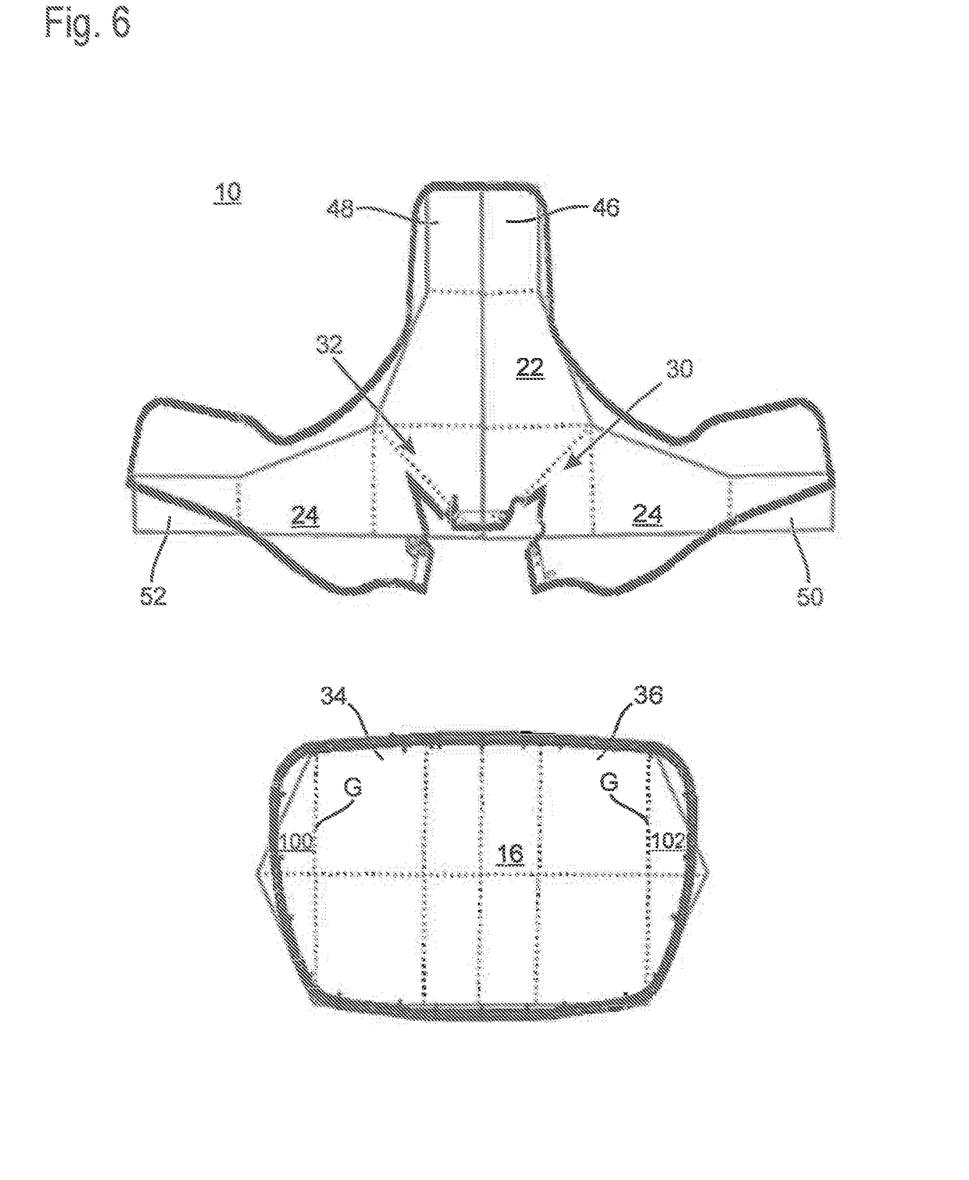
FIG. 6 a top view onto a modified cutting option based on the embodiment according to FIG. 5.

FIG. 6 illustrates a possible modification of the embodiment according to FIG. 5.

In order to round off the basic shape of the front airbag resulting from the cut according to FIG. 5, especially in the transitions from the individual portions, the cut can be shaped along the bold lines. The cut shape according to FIG. 5 is equally Inserted tor comparison by fine lines. The cutting lines are curved in this case so as to obtain a desired rounding of the front airbag 10.

FIGS. 7 to 10 illustrate embodiments of cuts of a front airbag 10 according to the invention in which, with an outspread cut of the airbag, the central portion 44 projects from the outer portions and the transitional portions 34, 36. At least one projecting portion forms the connecting portions 46, 48, 50, 52 and thus a portion of the upper and lower walls 22, 24.

In this case, too, the out elements are based on the example known from FIG. 3.

Figure 7:
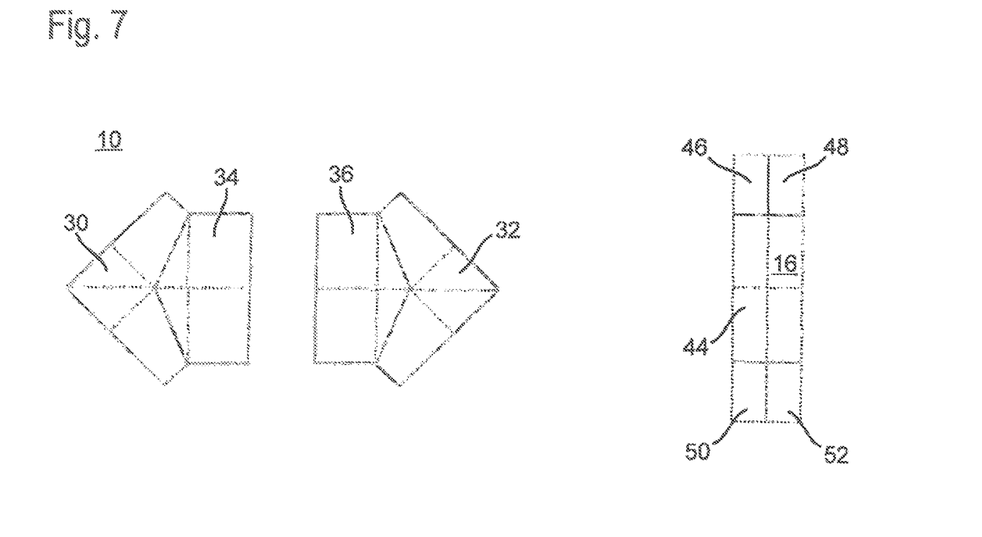
FIG. 7 a top view onto a further cutting option based on the embodiment according to FIG. 3.

In the embodiment according to FIG. 7 a cut part is formed by an elongate rectangle comprising the central portion 44 forming the front wall 16 and the connecting portions 48, 48, 50, 52.

The two further cuts comprise the side portion 30 and the transitional portion 34 and, resp., the side portion 32 and the transitional area 36.

Figure 8:
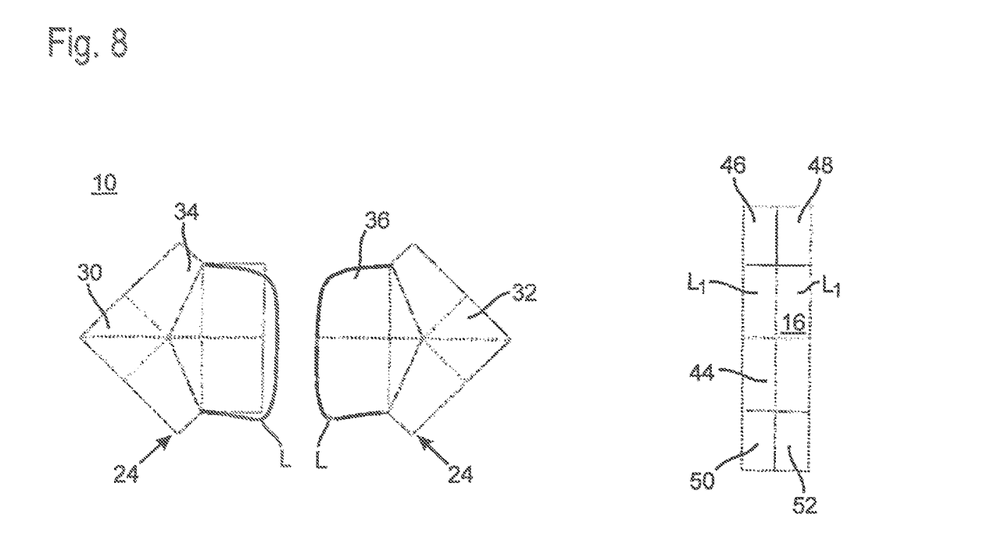
FIG. 8 a top view onto a further cutting option based on the embodiment according to FIG. 3.

FIG. 8 illustrates a modification of the embodiment according to FIG. 7. A modification of the contour of the transitional areas 34 and, resp., 36, in this case a displacement of the contour in the direction of the lower wall 24, allows a more distinct shape of the pelvis contact portion 42 (see bulging 31 in FIG. 1).

However, care has to be taken that the edge L takes the same length as the longitudinal side L1 of the cut part comprising the central portion 44 forming the front wall 16 and the connecting portions 46, 46, 50, 52.

Figure 9:
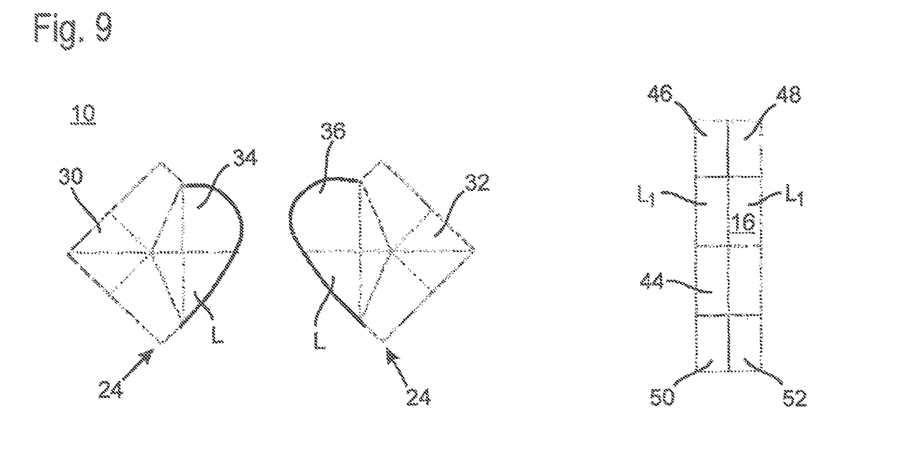
FIG. 9 a top view onto a further cutting option based on the embodiment according to FIG. 3.

FIG. 9 illustrates another modification similar to the example according to FIG. 8. However, in this case a recess in the area of the lower wall 24 at the contours of the transitional areas 34 and 36, resp., causes the pelvis contact portion 42 to be displaced further in the direction of the instrument panel 28 so that the indentation 33 according to FIG. 1 is formed. Otherwise the embodiment according to FIG. 9 is identical to the embodiment according to FIG. 8.

Figure 10:
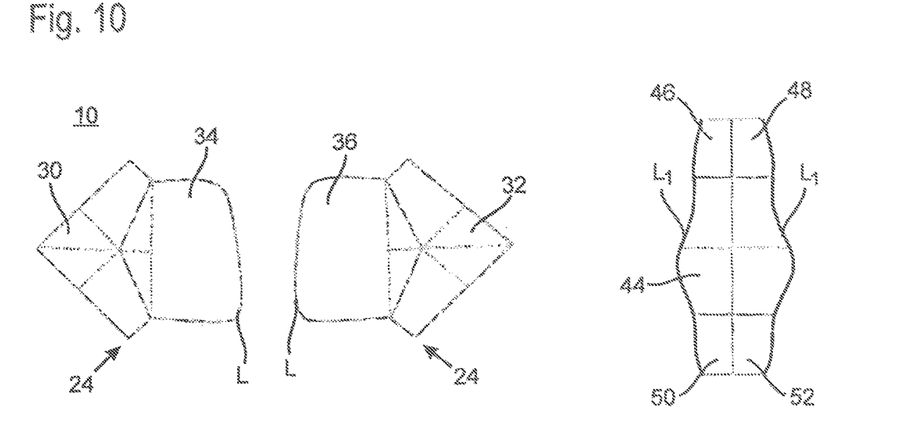
FIG. 10 a top view onto a further cutting option based on the embodiment according to FIG. 3.

FIG. 10 equally illustrates another modification similar to the example according to FIG. 8, in this case also the contour of the transitional areas 34 and 36, resp., is modified by displacing the contour in the area of the lower wall 24 so as to obtain a bulging and/or narrowing of the front wall 44. Otherwise the embodiment according to FIG. 9 is identical to the embodiment according to FIG. 8.

The invention claimed is:

1. A front airbag (10) comprising a cut that includes two substantially triangular side portions (30, 32) facing toward each other by a respective side which form side walls (18, 20) and at least portions of upper and lower walls (22, 24); and a central portion (44) located between the two side portions (30, 32) which is adjacent to the sides of the two side portions (30, 32) facing each other and forms a front wall (16), wherein in an area of the side walls (18, 20) transitional areas (34, 36) are present between each of the two side portions (30, 32) and the central portion (44), wherein at least one connecting portion (48, 48, 50, 52) for each of the transitional areas (34, 36) associated with the lower and/or upper wall (22, 24) projects from the central portion (44) or from the two side portions (30, 32) in an outspread state of the cut, and wherein the at least one connecting portion (46, 48, 50, 52) of a finished front airbag (10) is directly connected both to the central portion (44) and to the two side portions (30, 32).

2. The front airbag (10) according to claim 1, wherein the at least one connecting portion (46, 48, 50, 52) is substantially rectangular.

3. The front airbag (10) according to claim 1, wherein at least one connecting portion (46, 48, 50, 52) is connected by a first side to one of the two side portions (30, 32) and by a second side to the central portion (44).

4. The front airbag (10) according claim 1, wherein the at least one of the connecting portion (46, 48, 50, 52) comprises a plurality of connecting portions (46,48,50,52) projecting from the two side portions (30, 32) in the outspread state of the cut.

5. The front airbag (10) according to claim 1, wherein the central portion (44) is substantially rectangular and forms, along with the transitional areas (34, 36), an elongate rectangle connecting the two side portions (30, 32) along a length of the central portion (44).

6. The front airbag (10) according to claim 1, wherein the two side portions (30, 32) include base sides (G) connected to the transitional areas (34, 36) and that projecting corners (37) on the two side portions (30, 32) extending to the transitional areas (34, 36) are cut off diagonally outwardly.

7. The front airbag (10) according to claim 1, wherein the central portion (44) including the transitional areas (34, 36) is composed of plural cuts.

8. The front airbag (10) according to claim 1, wherein, with an outspread state of the cut, the central portion (44) projects from the transitional areas (34, 36) and the at least one connecting portion (46, 48, 50, 52) forms a portion of the upper or lower wall (22, 24).

9. The front airbag (10) according to claim 1, wherein, in a side view of an inflated state of the front airbag (10), the front airbag (10) substantially takes the shape of an at least pentagonal polygon.

10. The front airbag (10) according to claim 1, wherein the front wall (16) in an inflated state of the front airbag (10) is narrowed viewed in the direction of a front of the vehicle.

11. The front airbag (10) according to claim 1, wherein the front airbag (10) in an inflated state includes a bulging (31) facing outwardly to an occupant in the front wall (16) for contacting a pelvis region of the occupant.

12. The front airbag (10) according to claim 1, wherein the front airbag (10) in an inflated state in the front wall (16) includes a bulging (33) extending in a direction of a back wall (23) and arranged substantially horizontally to define a pelvis contact face for impact of a pelvis region of an occupant.

13. The front airbag (10) according to claim 1, wherein the front wall (16), viewed in a side view, in an inflated and vehicle-mounted state of the front airbag (10) includes a head contact portion (38) which is closer to a vehicle tail (FH) than a thorax contact portion (40).

14. The front airbag (10) according to claim 13, wherein in an area of the thorax contact portion (40) and of the head contact portion (38) the front wall (16) extends slanting upwardly in a direction of the vehicle tail (FH).

15. The front airbag (10) according to claim 13, wherein, viewed in a side view, a curvature (39) extending from the head contact portion (38) to the upper wall (22) is larger than a maximum curvature of the upper wall (22) and the front wall (16).

16. The front airbag (10) according to claim 13, wherein, viewed in a side view, a curvature extending from a pelvis contact portion (42) of the front wall (16) to the lower wall (24) is larger than a maximum curvature of the lower wall (24) and the front wall (16).

17. The front airbag (10) according to claim 13, wherein the upper wall (22) extends from a back wall (23) for resting on a front screen (28), viewed in a side view, at a maximum angle (α) of 30° vis-à-vis a horizontal line extending to the head contact portion (38).

18. The front airbag (10) according to claim 1, wherein each connecting portion (46, 48, 50, 52) is a projecting extension which is integrally connected to one of the two side portions (30, 32) or to the central portion (44).

19. The front airbag (10) according to claim 1, wherein two of the at least one connecting portion (46, 50) are secured directly to opposite ends of one of the side portions (30) and two of the at least one connecting portion (48, 52) are secured directly to opposite ends of another of the side portions (32).

20. A front airbag comprising:
a cut including a pair of triangular side portions forming side walls and at least portions of upper and lower walls, each of the side portions including a side facing one another;
a central portion forming a front wall and positioned between the side portions adjacent the sides of the side portions facing one another;
transitional areas positioned between the side portions and the central portion in an area of the side walls; and
connecting portions associated with at least one of the lower wall and the upper wall and projecting from one of the central portion and the side portions in an outspread state of the cut;
wherein, in a finished state of the front airbag, the connecting portions are connected to both the central portion and the side portions.

21. The front airbag according to claim 20, wherein two of the at least one connecting portion are secured directly to opposite ends of one of the side portions and two of the at least one connecting portion are secured directly to opposite ends of another of the side portions.

* * * * *

UNITED STATES PATENT AND TRADEMARK OFFICE
CERTIFICATE OF CORRECTION

| | |
|---|---|
| PATENT NO. | : 9,908,498 B2 |
| APPLICATION NO. | : 15/116273 |
| DATED | : March 6, 2018 |
| INVENTOR(S) | : Mathias Luna Nell |

Page 1 of 1

It is certified that error appears in the above-identified patent and that said Letters Patent is hereby corrected as shown below:

Column 8, Line 19 in Claim 1 reads "48,48" should read --46,48--

Column 8, Line 30 in Claim 3 reads "wherein at" should read --wherein each of the at--

Signed and Sealed this
Seventeenth Day of April, 2018

Andrei Iancu
*Director of the United States Patent and Trademark Office*